United States Patent
Bannister et al.

(10) Patent No.: US 6,430,282 B1
(45) Date of Patent: Aug. 6, 2002

(54) METHODS AND APPARATUS FOR ORIGINATING VOICE CALLS

(75) Inventors: Cecil H. Bannister, Colorado Springs, CO (US); Rangaprasad Govindarajan; Russell A. Edwards, both of Dallas, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 08/652,659

(22) Filed: May 28, 1996

Related U.S. Application Data (60) Provisional application No. 60/004,603, filed on Sep. 29, 1995.

(51) Int. Cl.[7] .......................... H04M 1/64; H04M 3/42; H04M 3/00

(52) U.S. Cl. .................. 379/211.02; 379/88.17; 379/212.01; 379/219; 379/220.01; 379/225; 379/265.01; 379/265.09; 379/266.04

(58) Field of Search .............................. 379/67, 69, 88, 379/89, 201, 90.01, 93.09, 100.15, 211, 215, 258–265, 88.17, 88.18, 147.07, 201.01, 211.02, 212.01, 219, 220.01, 224, 225, 265.01, 265.09, 266.04

(56) References Cited

U.S. PATENT DOCUMENTS

| | | | |
|---|---|---|---|
| 3,854,014 A | 12/1974 | Akin et al. ............. 379/18 BG |
| 4,866,758 A | 9/1989 | Heinzelmann ............... 379/94 |
| 4,942,598 A | * 7/1990 | Davis .......................... 379/57 |
| 5,241,588 A | * 8/1993 | Babson, III et al. ......... 379/201 |
| 5,311,583 A | 5/1994 | Friedes et al. ............... 379/209 |
| 5,327,486 A | * 7/1994 | Wolff et al. ................... 379/96 |
| 5,341,412 A | 8/1994 | Ramot et al. .................. 379/92 |
| 5,406,620 A | 4/1995 | Pei .............................. 379/220 |
| 5,438,616 A | 8/1995 | Peoples ....................... 379/201 |

(List continued on next page.)

FOREIGN PATENT DOCUMENTS

| | | |
|---|---|---|
| AU | 683392 | 1/1996 |
| DE | 36 29 468 | 3/1988 |

(List continued on next page.)

OTHER PUBLICATIONS

Novell, "Computer Telephony: The Netware Way," http://www.4intersect.com/cti/docs/content.html, pp. 1–19 (Mar. 1995).

Newton, H., "Newton's Telecom Dictionary," Flatiron Publishing Inc., ISBN 0–936648–60–0, pp. 279, 1020, and 1022 (Nov. 1994).

(List continued on next page.)

*Primary Examiner*—Allan Hoosain
(74) *Attorney, Agent, or Firm*—Dennis R. Haszko (57) ABSTRACT

In methods and apparatus for originating a voice call between first and second voice terminals, a voice call request is received at a data service node, the voice call request identifying the first voice terminal. A call origination request is transmitted from the data service node to a telecommunication switch, the call origination request identifying the first and second voice terminals. The telecommunications switch originates one call from the telecommunications switch to the second voice terminal and another call front the telecommunications switch to the first voice terminal. The telecommunications switch then connects the one call to the other call to connect the first voice terminal to the second voice terminal. The methods and apparatus are particularly useful in connection with advertising on the World Wide Web and in connection with international calling services.

12 Claims, 9 Drawing Sheets

FOREIGN PATENT DOCUMENTS

| | | |
|---|---|---|
| EP | 0 394 811 | 10/1990 |
| EP | 0 611 083 A1 | 8/1994 |
| EP | 0 676 886 A2 | 10/1995 |
| FR | 2 677 517 | 12/1992 |
| JP | 5-22470 | 1/1993 |
| JP | 7-264323 | 10/1995 |
| WO | 92/01350 | 1/1992 |
| WO | WO 93/22866 | 11/1993 |
| WO | 94/24803 | 10/1994 |
| WO | WO 94/26056 | 11/1994 |
| WO | 96/09710 | 3/1996 |
| WO | 97/35416 | 9/1997 |

OTHER PUBLICATIONS

Novell, "Call Control: A Technology Overview," http://developer.novell.com/research/appnotes/1995/feb./03/02.htm, pp 1–3 (Feb. 1995).

Mitel Corporation, "A Computer Telephony Integration Primer," cti Primer, Pub. No. 9147–952–300–NA, pp. 1–70, Canada (1994).

Taylor, D., "MacWorld Creating Cool Web Pages with HTML," IDG Books Worldwide, Inc., pp. 29–31 and 177–181 (1995).

Krol, E., "The Whole Internet User's Guide & Catalog," O'Reilly & Associates, Inc., pp. 255–260 (1992).

Bauer, "Der Computer lernt telefonieren," Nachrichten Elektronik und Telematik, vol. 48, No. 10, pp. 14–18, Heidelberg, Federal Republic of Germany (Oct. 1994).

* cited by examiner

METHODS AND APPARATUS FOR ORIGINATING VOICE CALLS

This application claims the benefit of U.S. Provisional Application No. 60/004,603, filed Sep. 29, 1995.

FIELD OF THE INVENTION

This invention relates generally to methods and apparatus for originating voice calls, and more particularly to methods and apparatus for originating voice calls using a data terminal connected to a data service node.

BACKGROUND OF INVENTION

Today, many businesses are aggressively participating in the information highway phenomenon by advertising their goods and services on World Wide web home pages that are accessible to the general public via the Internet data network. The number of businesses advertising on the World Wide Web is exploding.

However, as businesses gain experience with advertising on the World Wide Web, they recognize that their home pages may not efficiently provide the information required by each individual customer or effectively sell their product or service to each individual customer. Many customers may browse their home pages on the World Wide Web, but may not take the time to investigate further to answer any remaining questions they may have, and the advertisers may miss business opportunities as a result.

To encourage customers to investigate further, and to provide the opportunity to sell directly to the customer, many advertisers provide a 1-800 number on their home pages and suggest that potential customers call for further information.

However, in order to route customer calls made to the 1-800 number to a specialist who can answer the particular customer's questions, the advertiser must use a human attendant or an interactive voice response system to route the calls based on the information desired by the customer. Customers who use the World Wide Web to find product and service information want to obtain that information quickly and with a minimum effort. Such customers consider the process of working through human attendants and interactive voice response systems to find the person who can answer their questions to be unacceptably time-consuming and tedious, especially when they are put on hold waiting for that person to become available. Consequently, many such customers wills not call 1-800 numbers to obtain further information, and the advertiser misses an opportunity to sell directly to the individual customer.

World Wide Web advertisers could overcome this problem by providing several distinct 1-800 numbers on their information pages and indicating clearly that. each 1-800 number will connect callers directly to someone who can deal with their specific questions. However, the requirement for several distinct 1-800 numbers would increase the advertiser's telecommunications costs considerably and would not assure the caller that someone will be available to answer their questions immediately when they call.

Today, telephone operating companies provide printed telephone directories including "yellow pages" which provide entries for businesses grouped according to the products or services provided by the businesses. Users of the "yellow pages" locate the product or service category of interest in the "yellow pages", select a business based on its entry in the "yellow pages", and dial the telephone number listed in the entry for that business. The user may make errors dialing the listed number. Moreover, even when the user dials correctly, the call may be unanswered, or may be connected to an interactive voice response system or a human attendant for further routing. As noted above, many users dislike working through interactive voice response systems and human attendants.

Today, the tariffs charged by a telephone operating company in a first country for placing a voice call to a second country may be significantly greater than the tariffs charged by a telephone operating company in the second country for placing a voice call from the second country to the first country. For example, the voice tariffs charged by a Japanese telephone operating company for placing a call from a first directory number in Japan to a second directory number in the US are considerably higher than the rates charged by a US telephone operating company for placing a call from the second directory number in the US to the first directory number in Japan. US service providers capitalize on this discrepancy by offering services by which a Japanese caller can call a US service provider and request a connection between the first directory number in Japan and the second directory number in the US. The US service provider then places a first call to the second directory number in the US, a second call to first directory number in Japan and connects the first and second calls to provide the desired connection. Because the connection is made from the US to Japan, the Japanese caller can be charged at a rate based on the lower tariffs charged by a US telephone operating company. However, the Japanese caller must also pay the cost of the short call from Japan to the US service provider required to set up the desired call.

SUMMARY OF INVENTION

An object of this invention is to provide methods and apparatus for originating voice calls between voice terminals using a data terminal and a data service node without requiring interaction with human attendants or interactive voice response systems to complete the call.

One aspect of the invention provides a method for originating a voice call between a first voice terminal and a second voice terminal. According to the method, a voice call request is sent from a data terminal to a data service node, the voice call request identifying the first voice terminal. A call origination request is transmitted from the data service node to a telecommunications switch, the call origination request identifying the first and second voice terminals. Two calls are originated at the telecommunications switch one call is from the telecommunications switch to the second voice terminal, and another call is from the telecommunications switch to the first voice terminal. The one call is connected to the other call at the telecommunications switch to connect the first voice terminal to the second voice terminal.

The data service node may display a command menu (for example a plurality of command icons) at the data terminal. In this case, the command menu comprises a voice call request command (for example a voice call request icon), and the data service node interprets selection of the voice call request command as a voice call request. The voice call request icon may comprise a data entry field and may indicate that the first voice terminal identifier is to be entered into the data entry field before selecting the voice call request icon. Alternatively, the data terminal may be operable in response to selection of the voice call request icon to read the first voice terminal identifier from a mail profile of the data terminal and to transmit the first voice terminal identifier to the data service node via the data network. The alternative approach requires additional software at the data terminal, but avoids the need for the operator of the data terminal to type the first voice terminal identifier each time a voice call is requested.

Advantageously, the command menu may comprise plural distinct voice call request commands, and the data service node may respond to distinct voice call request commands by transmitting to the telecommunications switch call origination requests comprising distinct respective second voice terminal identifiers. In this case, different voice call request commands may be executed to obtain different types of information and, in each case the request or of the voice call will be called by a particular agent who is familiar with the desired information. The voice call request commands displayed may explicitly state the type of information available if the voice call request commands are selected, or the type of information to be provided (and consequently the particular second voice terminal identifier to be included in the voice call origination request) may be inferred by the data service node from the context in which each distinct voice call command request appears in the data displayed at the data terminal.

The telecommunications switch may be programmed to originate the second call only when the first call has been accepted at the second voice terminal. In this case, the data service node may maintain a queue of call origination requests at the data service node when the second voice terminal is busy and may transmit from the data service node to the telecommunications switch the next call origination request in the queue each time the second voice terminal becomes idle.

In one application of the above method, the data service node may provide advertising services on the World Wide Web, and the data terminal may be operated by a potential customer accessing the advertising services via the Internet. The first voice terminal may be a telephone of the potential customer, and the second voice terminal may be a telephone of a business advertising by means of the advertising services. The potential customer may request a voice connection with the business by executing a command on the data terminal. The advertising services may be telephone directories or "yellow pages" accessed by the potential customer on the World Wide Web.

The call origination method described above minimizes the potential customer's inconvenience by automatically having an agent of the advertiser call the customer when that agent is available. Because the voice call is placed from the advertiser's agent to the potential customer, the potential customer is assessed no telecommunications charges. Consequently, the advertiser does not need to buy 1-800 service to avoid telecommunications charges to its potential customers. Because the advertiser does not require 1-800 service, the advertiser may provide several distinct call request commands without incurring a telecommunications cost penalty. Each distinct call request command may be made specific to a particular product line or type of information, so that the potential customer is assured of being connected to an agent that can provide the information or service required. It is anticipated that the increased convenience to the potential customer provided by this call origination method will enable World Wide Web advertisers to sell directly to at least some of those potential customers who are unwilling to call the 1-800 number presently provided on World Wide Web advertising pages, enabling the advertisers to sell directly to more potential customers.

Some advertisers may operate multiple geographically spaced data service nodes to serve potential customers over a large geographic area. Such advertisers may want to refer call origination requests to the agents who are located closest to the potential customer. To meet this requirement, the method described above may be extended to accommodate multiple data service nodes such that each data service node can forward voice call requests to other data service nodes. The data service node which receives the voice call request may select another data service node to which the voice call request may be forwarded based on the first voice terminal identifier.

In another application of the method described above, the data service node may be operated by a business offering international calling services, and the data terminal may be operated by an international caller who wishes to avoid high tariffs for placing voice calls from his home country to a foreign country. The international caller may request origination of a call between his telephone and a telephone in a foreign country using his data terminal. The data service node may cause a telecommunications switch in the foreign country to place calls to the voice terminal of the called party in the foreign country and to the voice terminal of the international caller to complete a voice connection by making only calls originated in the foreign country. No call from the home country to the foreign country is needed to set up the call, and no interaction with interactive voice response or human attendants is needed to set up the call.

Another aspect of the invention provides a data service node for connection to a data network to provide a data service. The data service node comprises means for receiving a voice call request and a first voice terminal identifier from a data terminal connected to the data service node via the data network, the first voice terminal identifier identifying a first voice terminal associated with the data terminal. The data service node further comprises means for transmitting to a telecommunications switch a call origination request comprising the first voice terminal identifier and a second voice terminal identifier, the second voice terminal identifier identifying a second voice terminal associated with the data service node.

Another aspect of the invention provides a data service system, comprising a data service node for connection to a data network to provide a data service and a telecommunications switch connected to the data service node. The data service node comprises means for receiving a voice call request and a first voice terminal identifier from a data terminal connected to the data network, the first voice terminal identifier identifying a first voice terminal associated with the data terminal, and means for transmitting to the telecommunications switch a call origination request comprising the first voice terminal identifier and a second voice terminal identifier, the second voice terminal identifier identifying a second voice terminal associated with the data service node. The telecommunications switch comprises means responsive to the call origination request to originate one call from the telecommunications switch to the second voice terminal and another call from the telecommunications switch to the first voice terminal. The telecommunications switch further comprises means for connecting the one call to the other call to connect the first voice terminal to the second voice terminal.

The data service system may comprise a plurality of data service nodes and a plurality of telecommunications switches, each data service node being connected to a respective telecommunications switch and being operable to forward voice call requests to others of the data service nodes. The data service nodes may select other data service nodes for the forwarding of voice call requests based on the first voice terminal identifiers.

BRIEF DESCRIPTION OF DRAWINGS

Embodiments of the invention are described below by way of example only. Reference is made to accompanying drawings in which.

DETAILED DESCRIPTION

Figure 1:
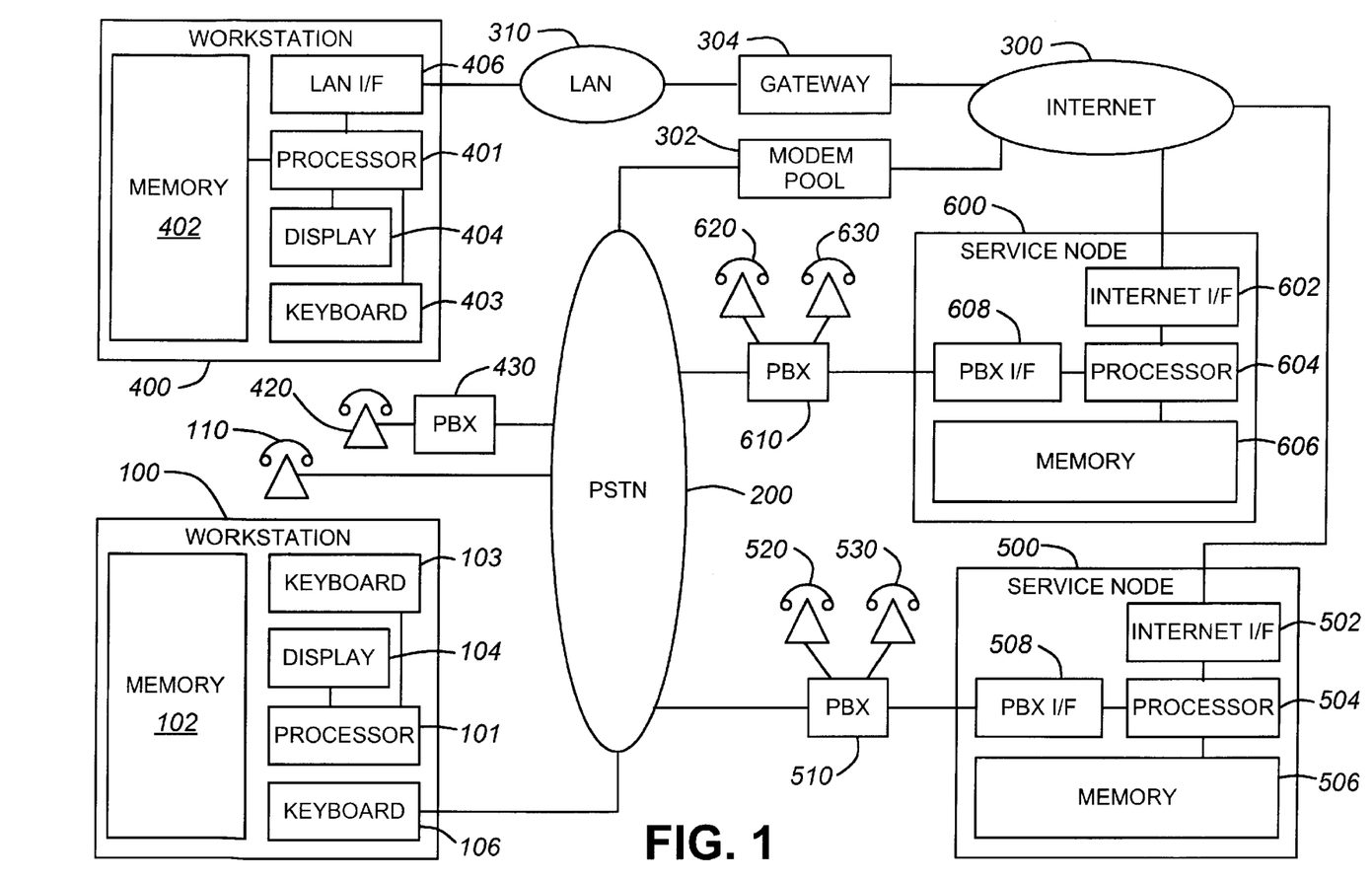
FIG. 1 is a block schematic diagram showing interconnected telecommunications networks incorporating one embodiment of the invention.

FIG. 1 is a block schematic diagram showing interconnected telecommunications networks incorporating an embodiment of the invention.

A data terminal in the form of a first workstation 100 comprises a processor 101, a memory 102 storing instructions for execution by the processor 101, a keyboard 103 for providing manual inputs to the processor 101 and a display 104 for displaying data to an operator of the workstation 100. The workstation 100 further comprises. a modem 106 for formatting data for transmission over the Public Switched Telephone Network (PSTN) 200.

A voice terminal in the form of a telephone 110 is located near the workstation 100 and is intended for the use of the operator of the workstation 100. The telephone 110 is also connected to the PSTN 200.

For example, the workstation 100 and the telephone 110 may be located in the operator's home. The operator may use the workstation 100 to obtain access to a data network in the form of the Internet 300 via the PSTN 200. A modem pool 302 links the PSTN 200 to the Internet 300 for this purpose. The memory 102 of the workstation 100 contains browser software (for example Netscape™), which the operator may use to "navigate" among various data services provided via the Internet 300.

Another data terminal in the form of a second workstation 400 comprises a processor 401, a memory 402 storing instructions for execution by the processor 401, a keyboard 403 for providing manual inputs to the processor 401 and a display 404 for displaying data to an operator of the workstation 400. The workstation 400 further comprises a LAN interface 406 for formatting data for transmission over a Local Area Network 410.

A voice terminal in the form of a telephone 420 is located near the workstation 400 and is intended for the use of the operator of the workstation 400. The telephone 420 is connected to the PSTN 200 via a Private Branch Exchange (PBX) 430.

For example, the workstation 400, the LAN 410, the telephone 420 and the PBX 430 may be located at the operator's place of business. The operator may use the workstation 400 to obtain access to a data network in the form of the Internet 300 via the LAN 410. An Internet gateway 304 links the LAN 410 to the Internet 300 for this purpose. The memory 402 of the workstation 400 contains "browser software" (for example Netscape™), which the operator may use to "navigate" among various data services provided via the Internet 300.

A data service node 500 is connected to the Internet 300 to provide data services. The data service node 500 comprises an Internet interface 502, a processor 504, and a memory 506. The memory 506 stores instructions to be executed by the processor 504 and data to be used by the processor 504 in executing those instructions. In particular, the memory 506 contains HyperText Transfer Protocol (HTTP) server software which enables the data service node 500 to forward World Wide web home pages to the workstations 100, 400 over the Internet 300 upon receipt of messages from the workstations requesting those home pages.

As is conventional in the operation of the World Wide Web, the data service node forwards HTMT, instructions to the workstation 100 together with the data required for display of the home pages. The HTML instructions are stored in the memory 102 and are executed by the workstation 100 when command icons displayed on the home pages are selected by the operator of the workstation 100 to send a message to the data service node 500, and the data service node 500 responds to the message to execute, the command corresponding to the icon. Some of the command icons may include data entry fields and textual instructions for filling of the data entry fields by the operator of the workstation 100. When such command icons are selected at the workstation 100, downloaded HTML instructions are executed at the workstation 100 to send a message incorporating the content of the data entry field to the data service node 500.

HTTP instructions stored in the memory 506 of the data service node 500 enable the data service node 500 to receive messages from the workstation 100 and to execute commands corresponding to those messages. The memory 506 may store additional software applications in languages other than HTTP. These applications may be executed in response to receipt of particular messages by the HTTP software.

According to an embodiment of the invention, the memory 506 of the data service node 500 contains HTTP instructions which enable the processor 504 to display voice call request icons on home pages forwarded to the workstation 100 from the data service node 500. The voice call request icons incorporate a data entry field and text instructing the operator of the workstation 100 displaying the home pages containing the icons to enter in the data entry field the directory number of the voice terminal (for example telephone 110) on which the operator wishes to receive a voice call, and then to select the icon in order to request a voice call. The memory 506 contains further HTTP instructions which enable the data service node 500 to receive messages corresponding to voice call request commands from the workstation 100 and call processing applications (described in more detail below) which are executed by the data service node 500 on receipt of messages corresponding to voice call request commands.

According to the embodiment of the invention the data service node 500 further comprises a PBX interface 508 which connects the processor 504 to a PBX 530. The PBX interface 508 enables the processor 504 to communicate with the PBX 510 using standard Advanced Intelligent Network (AIN) protocols to control call processing by the PBX 510 and to obtain call status information from the PBX 510. The PBX 510 connects second voice terminals in the form of telephones 520, 530 to the PSTN 200, and includes Automatic Call Distribution (ACD) software for monitoring the status of the telephones 520, 530 and for distributing incoming calls to the telephones 520, 530.

Another data service node 600 is also connected to the Internet 300 to provide data services. Like the data service node 500, the data service node 600 comprises an Internet interface 602, a processor 604, a memory 606, and a PBX interface 608 connected to a PBX 610 serving telephones 620, 630. Each element of the data service node 600 performs the same functions as the corresponding element of the data service node 500.

In one application of the interconnected networks described above, the operator of workstation 100 connects the workstation 100 to the Internet 300 via the PSTN 200 using conventional Internet access procedures. Using the browser software stored in the workstation 100, the operator uses conventional browsing procedures to locate World Wide Web home pages and to display those home pages on the workstation 100.

In this application example, the operator locates and displays a home page provided by data service node 500. The home page content advertises goods or services marketed by a particular business. The displayed home page includes voice call request icons as described above, and HTML instructions corresponding to the voice call request icons are downloaded from the data service node 500 to the workstation 100 together with the data needed to display. the home page.

The operator of the workstation 100 wants more information than is displayed on the home page and decides to execute the voice call request command to obtain the desired information. The operator enters the directory number of the telephone 110 in the data entry field as instructed by the text of the voice call request icon and selects the icon. The workstation 100 executes HTML instructions corresponding to the voice call request icon to send to the data service node 500 a call request message incorporating the entered directory number.

The data service node 500.receives and interprets the message using HTTP software which triggers application software to select a second voice terminal identifier in the form of an extension number for one of the telephones 520, 530 connected to the PBX. The directory number and the selected extension number are forwarded to the call processing application which formulates a call origination request containing the directory number and the extension number, and sends the call origination request to the PBX 510 via the PBX interface 508.

The PBX 510 processes the call origination request to originate a first voice call from the PBX 510 to the telephone 520 associated with the data service node 500. When the first voice call is answered at the telephone 520, the PBX 510 originates a second voice call from the PBX 510 to the telephone 110 associated with the workstation 100. When the second voice call is answered at the telephone 110, the PBX 510 connects the two calls to connect the telephone 110 to the telephone 520.

The call is connected via the PSTN, so that an agent of the advertising business using a telephone 520 at the selected extension number can talk directly to the operator of the workstation 100 using the telephone 110 at the specified directory number. Because the call is originated by the advertising business, the advertising business is billed by the PSTN provider for any telecommunications charges resulting from the voice call.

Figure 2:
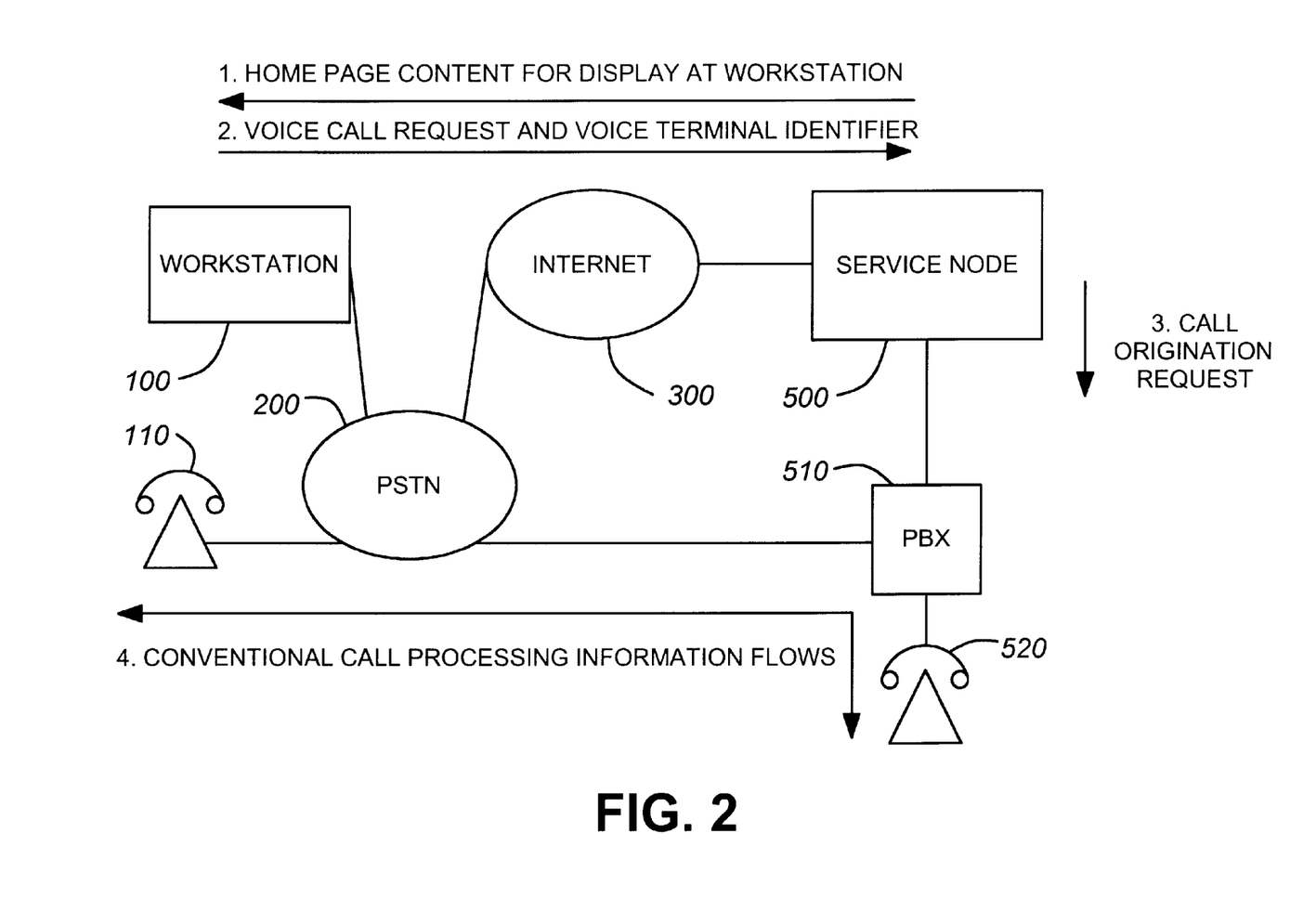
FIG. 2 is an information flow diagram summarizing information flows in the interconnected networks of FIG. 1 as required to generate and execute a voice call request.

The information flows required to process the voice call request are summarized in FIG. 2.

In the same way, the operator of workstation 400 (see FIG. 1) can connect to the Internet 300 in a conventional manner, locate and display the home page provided by the data service node 500, and select a voice call request icon to request a return voice call, and the data service node 500 and the PBX 510 will process the voice call request to connect the telephone 520 associated with the data service node to the telephone 420 associated with the workstation 400.

The HTTP instructions stored in the data service node 500 may be such as to provide the home pages with multiple voice call request icons, each corresponding to information of a different type. In this case, the application software instructions which are executed to formulate the call origination request may select from among multiple extension numbers depending on which of the voice call request icons was selected by the workstation operator. If the operator of the workstation 100 selects a voice call request icon which appears in the context of information about a first product, for example, the data service node 500 may formulate a call origination request containing the extension of the telephone 520 which is assigned to an agent who has information concerning the first product. If the operator of the workstation 100 selects a voice call request icon which appears in the context of information about a second product, the data service node 500 may formulate a call origination request containing the extension of another telephone 530 which is assigned to another agent who has information concerning the second product.

The call processing application of the data service node 500 may sense the busytidle status of the telephones 520, 530 connected to the PBX 510 via the PBX interface 508 using the standard AIN protocol of the PBX interface 508. In this case, the call processing application of the data service node may maintain a queue of call origination requests for each of the telephones 520, 530 when those telephones are busy. The data service node 500 transmits the next call origination request in the queue to the PBX 510 each time the busy telephone becomes idle. The data service node 500 may display the position of the call origination request in the queue on the workstation from which the call origination request was received so that the operator knows when to expect a voice call in response to the request.

When the telephones 520, 530 are all busy, the data service node 500 may download a command menu to the workstation 100, inviting the operator of the workstation 100 to communicate via alternative means, e.g. electronic mail, voice mail or short message service. When the appropriate commands are selected from the menu at the workstation 100, downloaded HTML instructions can be executed to connect the workstation to the requested service to enable the operator of the workstation to communicate by the selected means.

Large businesses may provide advertising home pages from geographically separated data service nodes 500, 600. In this case, the operator of the workstation 100 may access the home pages provided by a relatively remote data service node 500 and issue a voice call request. The advertising business may prefer that the requested voice call be made by an agent who is located closer to the operator of the workstation. The HTTP software which handles incoming messages corresponding to voice call requests may screen such messages based on the directory number contained therein, and forward some messages to another data service node 600 which is located closer to the operator of the workstation 100. The data service node 600 to which the voice call is forwarded then processes the voice call request to originate a call from a telephone 620 to the telephone 310 at the directory number specified by the operator of the workstation. The data service node to which voice call requests are forwarded could also be selected on the basis of time of day to provide voice call service over extended hours when local agents may not be on duty, or on the basis of monitored traffic loads to provide faster service to workstation operators requesting voice calls.

The voice call request icons placed at different locations on the pages of information displayed at the workstation 100 can correspond to different sets of HTML instructions providing different messages to the data service node 500 causing the data service node 500 to route resulting calls to different extensions 520 of the PBX 510. Consequently, the extension 520 can be selected based on the context of the voice call request command to ensure that the agent responding to the voice call request is familiar with the information likely to be requested.

Alternatively, the different sets of HTML instructions corresponding to each voice call request icon can provide messages to the data service node 500 which cause the data service node 500 to route the calls to the same extension 520, but with information about the context of the voice call request. The information could either be displayed at the agent's workstation or audibly announced to the agent when the call is accepted at the extension 520.

The voice call request icon displayed at the workstation 100 could include data fields which could be filled by the operator of the workstation. The HTML instructions executed by the workstation 100 could be such as to include the content of these fields in the message sent to the data service node 500 upon selection of the voice call request icon. The data service node could then relay the content of these fields to the agent's workstation for display or to the agent's extension via text to speech conversion and audible announcement. For example, such data fields could include details of the information the operator of the workstation 100 wishes to obtain from the agent.

Figure 3:
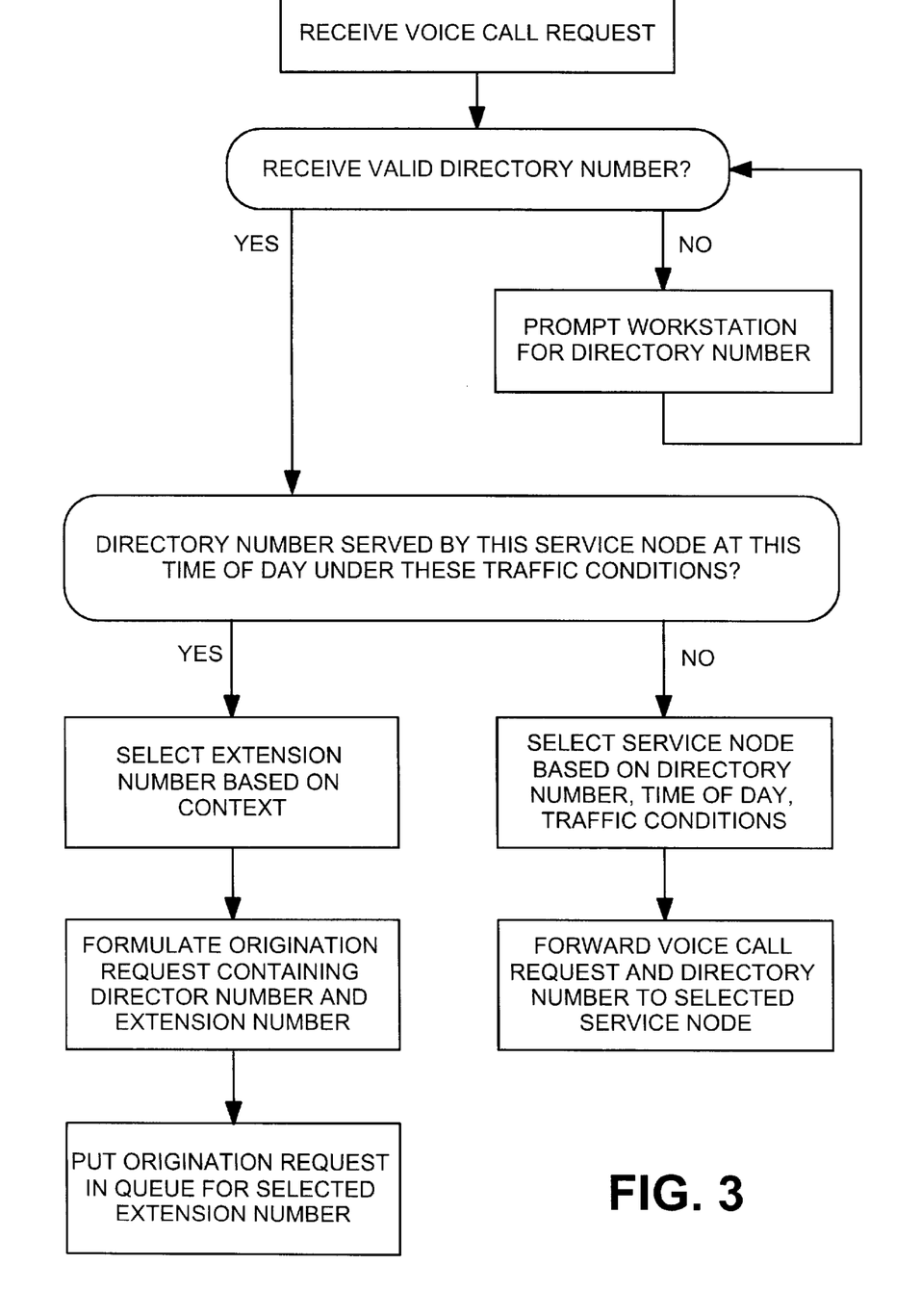
FIG. 3 is a flow chart illustrating steps in a first task performed by a data service node of the telecommunications networks of FIG. 1 to process a voice call request.
Figure 4:
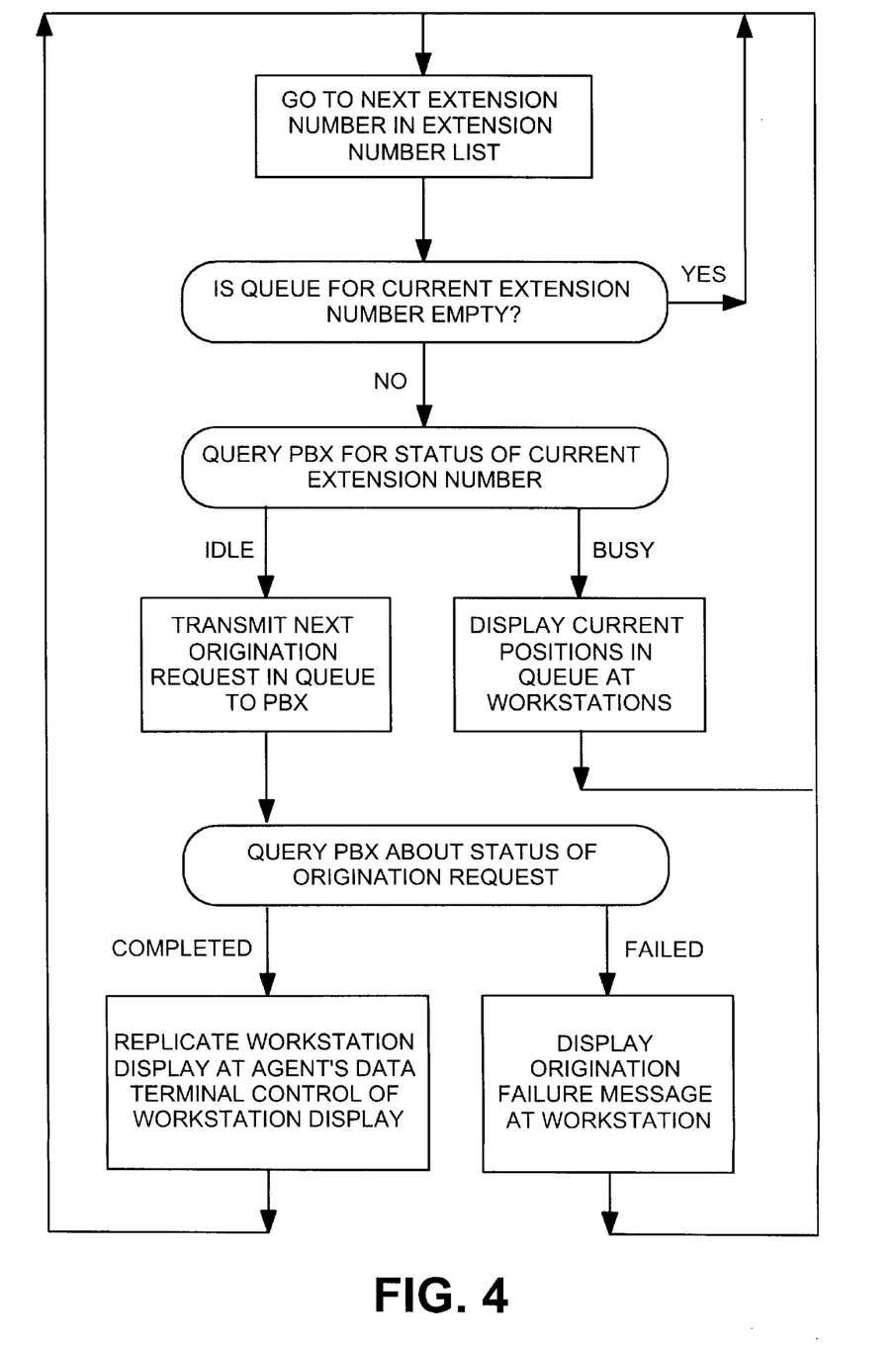
FIG. 4 is a flow chart illustrating steps in a second task performed by a data service node of the telecommunications networks of FIG. 1 to process a voice call request.

FIGS. 3 and 4 are flow charts illustrating how the processes performed by the data service node 500 as described above may be implemented as two tasks. The first task, illustrated in FIG. 3, receives voice call requests and voice terminal directory numbers, processes these to formulate origination requests, and inserts the origination requests into appropriate queues. The second task, illustrated in FIG. 4, transfers the origination requests from the queues to the PBX to complete the requested voice calls.

The embodiments described above may be modified without departing from the principles of the invention. For example, the directory number of the telephone 110 (see FIG. 1) may be stored in the mail profile of the browser software at the workstation 100, and the HTML instructions downloaded from the data service node 500 to the workstation 100 for execution when the voice call request icon is selected may request the directory number from the mail profile without requiring that the operator type the directory number. In this case the downloaded HTML instructions may display the directory number obtained from the mail profile at the workstation 100 and may request that the operator of the workstation 100 confirm or modify the directory number as appropriate before transmitting the voice call request message to the data service node 500 in a further refinement, the agents of the advertising business may be provided with data terminals connected to the processor 504 of the data service node 500. The HTTP software of the data service node 500 may download the same information to the data terminal of the agent as is downloaded to the workstation 100 so that the agent and the operator of the workstation view the same displayed information. The data terminals of the agents may be enabled to download information from the data service node 500 to the workstation 100 so that the agent can control the information displayed at the operator's workstation 100. This enables the operator requesting the voice call and the agent of the advertising business to converse with both voice and images simultaneously.

The call processing application of the data service node 500 may be programmed to call from the PBX 510 to the telephone 110 at the specified directory number, to provide a voice announcement indicating that the agent will join the call shortly when the call is successfully answered at the telephone 110, and to connect the call through to the agent's extension 520 only when the call has been successfully answered at the telephone 110. This maximizes the efficiency of the agents, though this feature should be used judiciously to avoid alienating the operator of the workstation 100.

Alternatively, the PBX 510 could place the call to the agent's extension 520 first, and place the call to the telephone 110 only when the agent has accepted the call. This maximizes the convenience of the potential customer, but reduces the efficiency of the agent.

The PBX interface 508 could communicate with the PBX 510 using protocols other than AIN. For example, other standardized protocols such as the Computer Telephony Interface (CTI) or the Small Computer Application Interface (SCAI) could be used, or proprietary protocols, such as the Meridian Links™ protocol to Northern Telecom™, could be used. The data service node 500 and the PBX could be integrated on a single computer platform, or the data service node 500 could communicate with telecommunications switches of the PSTN 200 using standard AIN protocols. Voice calls could be routed from the PBX 510 via the PSTN 200 to voice terminals at remote locations, for example to agents, homes if agents are "telecommuting", or to other locations of the advertiser's business.

These and other modifications are within the scope of the invention as defined by the claims below.

Figure 5:
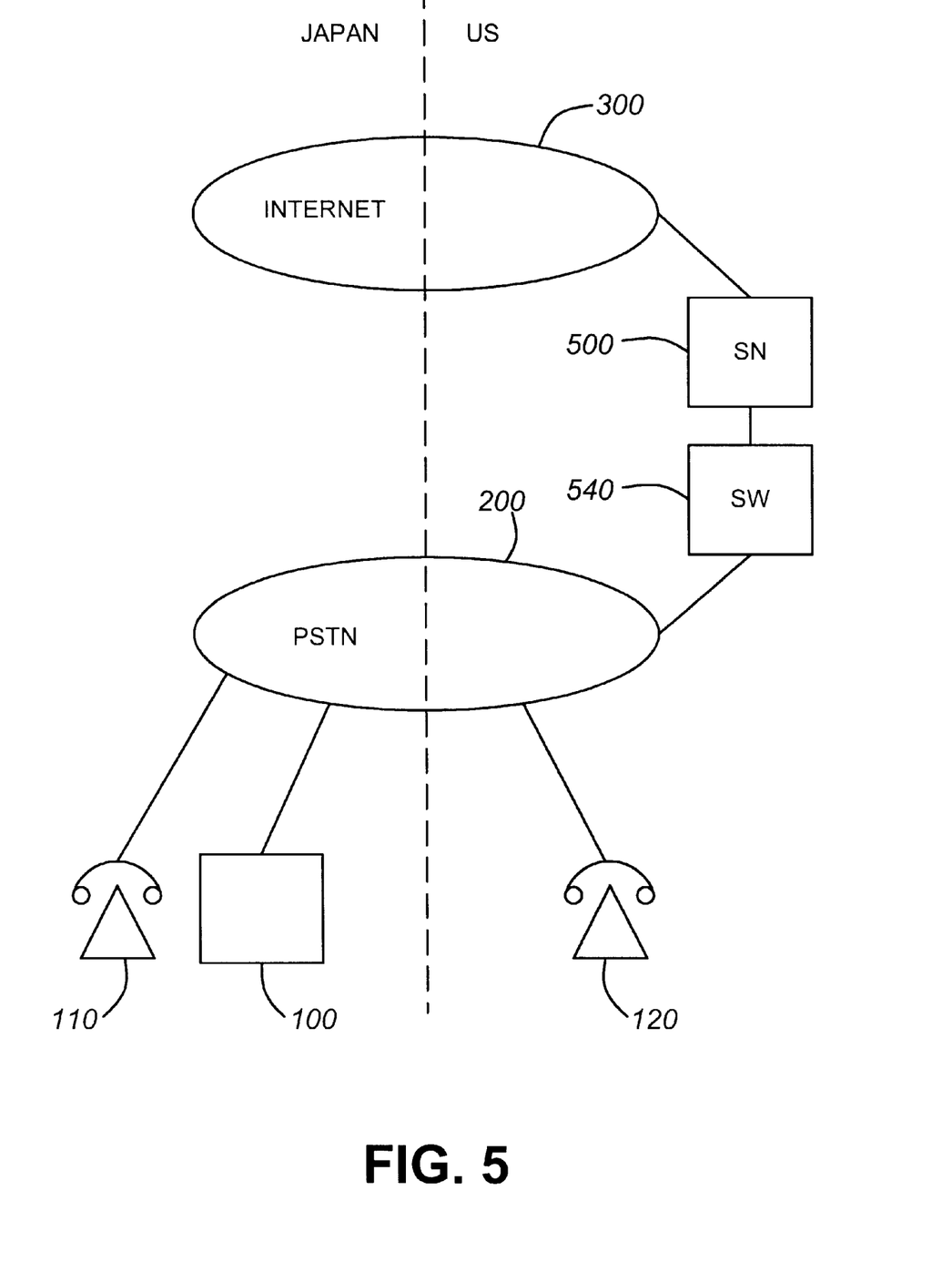
FIG. 5 is a block schematic diagram showing interconnected telecommunications networks incorporating another embodiment of the invention.

FIG. 5 is a block schematic diagram of interconnected telecommunications networks which implement. another embodiment of the invention. This architecture may be used, for example, to implement an Internet "Yellow Pages" service.

The interconnected networks of FIG. 5 are essentially as illustrated in FIG. 1, except that the data service node 500 is connected to a telecommunications switch 540 which may not be a PBX. The telecommunications switch 540 is connected to the PSTN 200 and may be integrated with the data service node 500.

In one application of the interconnected networks of FIG. 5, the operator of workstation 100 locates and displays World Wide Web "Yellow Pages" provided by the data service node 500. The operator of the workstation 100 locates the listing which interests him and executes the voice call request command associated with that listing. The workstation 100 executes HTML instructions corresponding to the voice call command to send the data service node 500 a call request message incorporating the directory number of his telephone 110.

The HTTP software of the data service node 500 receives and interprets the message and triggers application software running on the data service node 500 to select a directory number associated with the listing corresponding to the voice call command associated with the listing selected by the operator of the workstation 100. The directory number is forwarded to call processing software which formulates and sends a call origination message containing the directory number of the telephone 110 and the directory number associated with the selected listing to the telecommunications switch 540.

The telecommunications switch 540 processes the call origination request to originate a voice call from the telecommunications switch 540 via the PSTN 200 to a telephone 120 corresponding to the directory number associated with the selected listing. The telecommunications switch 540 also originates a voice call from the telecommunications switch 540 to the telephone 110 of the person requesting the call. The telecommunications switch 540 connects the two calls to connect the telephone 110 to the telephone 120 via the PSTN 200 and the switch 540. Because the person requesting the call selects the listing on a displayed screen of information, dialling errors are avoided. Moreover, because the telecommunications switch 540 is connected to the telephones 120 of businesses having listings in the "Yellow Pages" via the PSTN 200, the data service node 500 can provide call closure services to businesses which are geographically dispersed.

In another application of the network architecture of FIG. 5, the data service node provides an international calling service. The operator of workstation 100, located for example in Japan, accesses and displays a World Wide Web page of a US service provider implemented on the data service node 500. The operator of the workstation 100 executes a voice call request command which specifies the directory number of a telephone 120 in the US to which he wishes to place a call. The workstation 100 executes HTML instructions corresponding to the voice call command to send the data service node 500 a call request message incorporating the directory number of his telephone 110 and the directory number of the telephone 120 he wishes to call. The call request message also includes any authorization codes needed to ensure that the service is restricted to valid subscribers, and any billing codes (e.g. calling card numbers) needed to bill the cost of the call back to the caller.

The data service node 500 receives the message, and formulates and sends a call origination message containing the directory number of the telephone 110 and the directory number of the telephone 120 to the telecommunications switch 540.

The telecommunications switch 540 processes the call origination request to originate a voice call from the telecommunications switch 540 via the PSTN 200 to the telephone 120. The telecommunications switch 540 also originates a voice call from the telecommunications switch 540 to the telephone 110. The telecommunications switch 540 connects the two calls to connect the telephone 110 to the telephone 120 via the PSTN 200 and the switch 540. Because the call is connected from the US to Japan, the person requesting the call can be billed at rates based on the relatively lower tariffs for placing international calls from the US. Moreover, the person requesting the call is not required to place a voice call from Japan in order to set up the desired call from the US.

Figure 6:
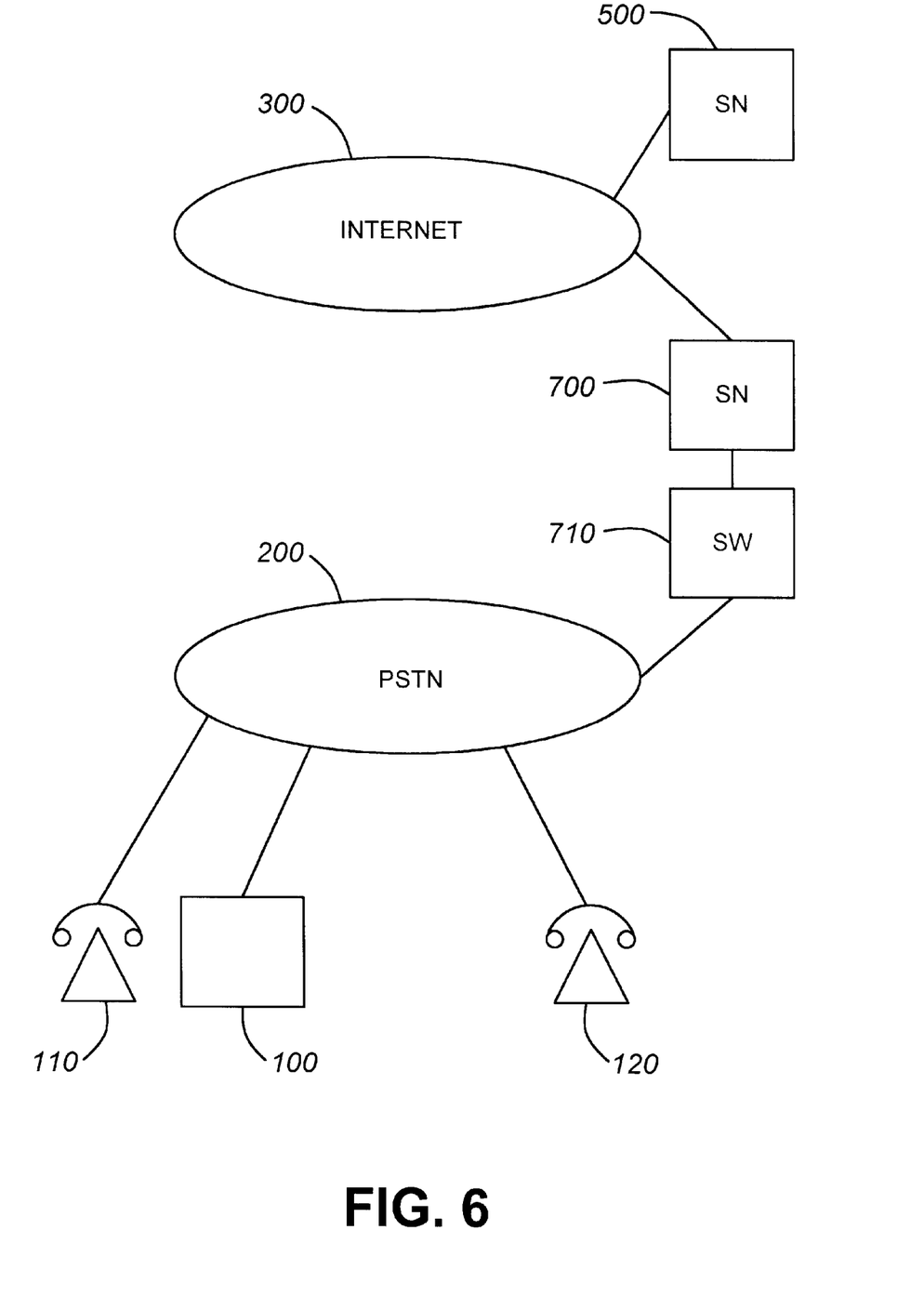
FIG. 6 is a block schematic diagram showing interconnected telecommunications networks incorporating another embodiment of the invention.

The architecture shown in FIG. 5 requires that each data service node 500 have associated telecommunications switching functionality 540. Because this functionality is relatively expensive, this requirement may inhibit smaller service providers from entering the marketplace. FIG. 6 is a block schematic diagram illustrating an alternative architecture which separates the telecommunications switching functionality from the functionality which provides data to workstation operators via the Internet 300 so that the telecommunications switching functionality can be provided to data service providers as needed by another service provider. According to FIG. 6, the data service node 500 is connected to another data service node 700 via the Internet, and the other data service node 700 is connected to a telecommunications switch 710 which is connected to the PSTN 200.

In an application of the architecture of FIG. 6, the operator of workstation 100 locates and displays World Wide Web pages provided by the data service node 500. The operator of the workstation 100 executes a voice call request command on the page of displayed information to request a voice connection. The workstation 100 executes HTML instructions corresponding to the voice call command to send the data service node 500 a call request message incorporating the directory number of his telephone 110.

The data service node 500 receives the message and selects a directory number associated with the particular voice call request command executed by the operator of the workstation 100 (unless the voice call request command already includes both directory numbers). The data service node 500 formulates and sends a call origination message containing both directory numbers and a billing code to the other data service node 700 via the Internet 300.

The other data service node 700 verifies that the billing code is valid and forwards the call origination request to the telecommunications switch 710. The telecommunications switch 710 processes the call origination request to originate a voice call from the telecommunications switch 710 via the PSTN 200 to the telephone 120. The telecommunications switch 710 also originates a voice call from the telecommunications switch 710 to the telephone 110. The telecommunications switch 710 connects the two calls to connect the telephone 110 to the telephone 120 via the PSTN 200 and the switch 710. Once the calls complete, the telecommunications switch 710 sends a call detail record back to the service node 700, and the service node 700 sends billing information to the data service node 500 so that the cost of the call can be billed, either to the operator of the workstation 100 or to the business for which the service is provided on the service node 500, depending on the nature of the service. (For example, international callback services and the like would be billed to the caller, while yellow pages services would be billed to the advertiser.)

Figure 7:
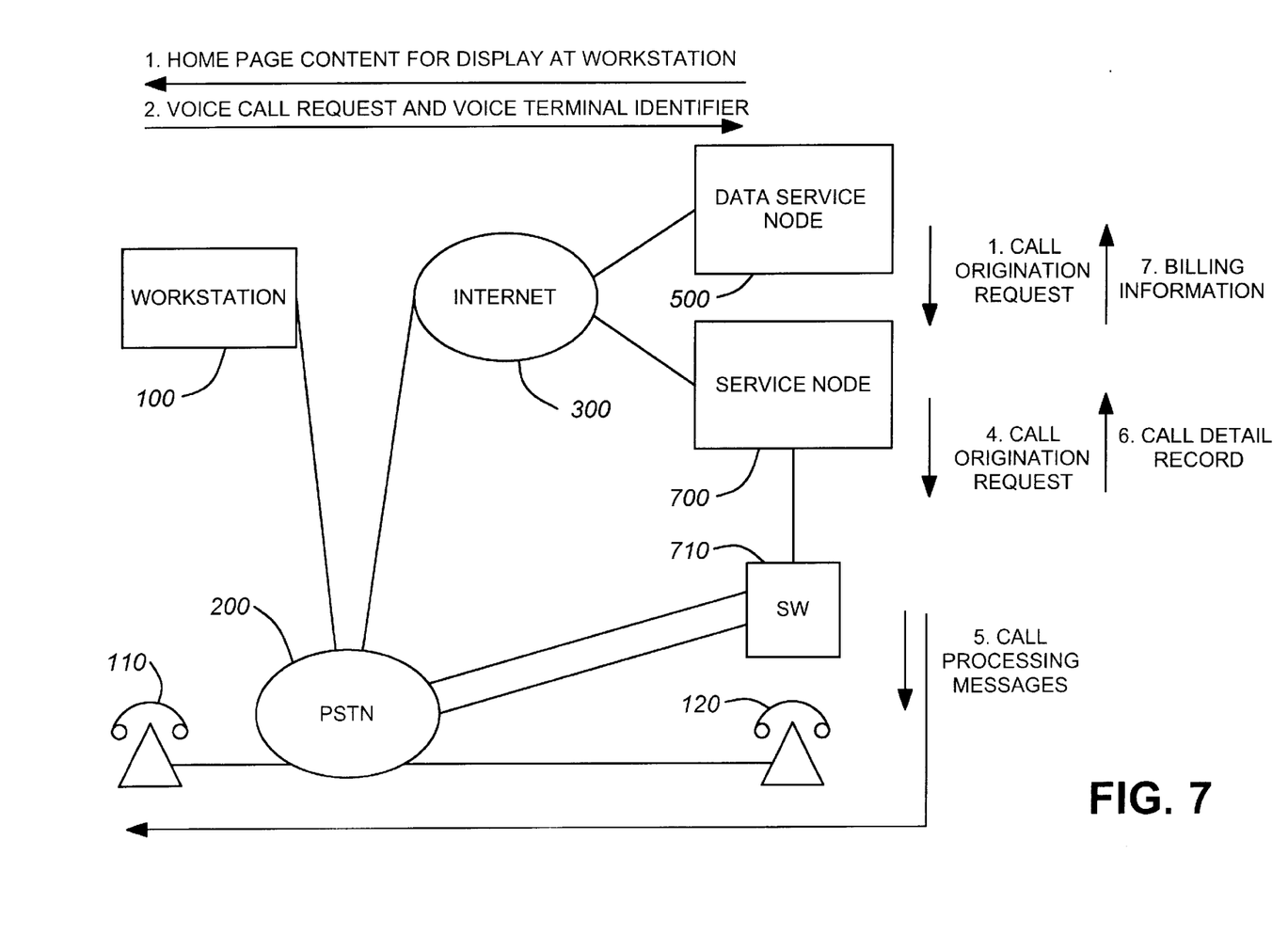
FIG. 7 is an information flow diagram summarizing information flows in the interconnected networks of FIG. 6 as required to generate and execute a voice call request.

The information flows discussed above are summarized in FIG. 7. In FIG. 7, the voice call Request 2 may contain the voice terminal identifier of the called telephone 120 in addition to the voice terminal identifier of the calling telephone 110 for services such as international callback. For such services, the Voice Call Request 2 could also contain authentication and billing codes used to screen use of the service and to bill the user of the service. The Voice call Request 2 could also contain text or voice messages to be forwarded upon connection to the telephone 120.

The Call Origination Request 3 will contain the voice terminal identifiers for both the calling telephone 110 and the called telephone 120, as well as any information needed to identify the data service node 500 or workstation 100 for authentication and billing purposes. The Call Origination Request 3 could also include text or voice messages to be forwarded upon connection to either of the telephones 110, 120, or the addresses of standard text or voice messages which are stored at the service node 700, the telecommunications switch 710, or peripherals connected to the switch 710. The Call Origination Request 3 could further include sets of executable instructions to be executed by the service node 700 in processing the Call Origination Request 3.

The forwarded Call Origination Request 4 will contain the voice terminal identifiers for both the calling telephone 110 and the called telephone 120 and a call identifier. The forwarded Call Origination Request 4 may also include text messages to be converted to speech at the telecommunications switch 710 (or one its peripherals) and played upon connection of the telephones 110, 120, voice messages to be played upon connection of the telephones 110, 120, or the addresses of standard voice messages which are stored at the telecommunications switch 710 or one of its peripherals.

The Call Processing Messages 5 are conventional call processing messages as are required to establish the connections from the switch 710 to the telephones 110, 120 and to link the connections at the switch 710.

The Call Detail Record 6 includes all information needed to bill the call, including the call identifier, identifiers of the telephones 110; 120, call duration and time, etc. The service node 700 (or a billing peripheral) processes the Call Detail Record 6 to formulate the Billing Information 7, which is forwarded to the data service node 500.

Further information flows may be added to those shown in FIG. 7. For example, if the data service node 500 will not provide the requested service, an appropriate message may be sent back to the. workstation 100. Similarly, if the service node 700 will not provide the requested service, appropriate messages may be sent from the service node 700 to the data service node 500 and from the data service node 500 to the workstation 100. The service node 700 may also send an appropriate message to the data service node 500 when the call is being placed, and the data service node 500 may then send an appropriate message to the workstation 100. The data service node 500 may forward some of the billing data to the workstation 100 for some services.

In the architecture of FIG. 6, the other data service node 700 and the telecommunications switch 710 can provide call completion services to several data service nodes 500 which provide data services including voice call request icons. Each data service node 500 may provide a different data service.

Figure 8:
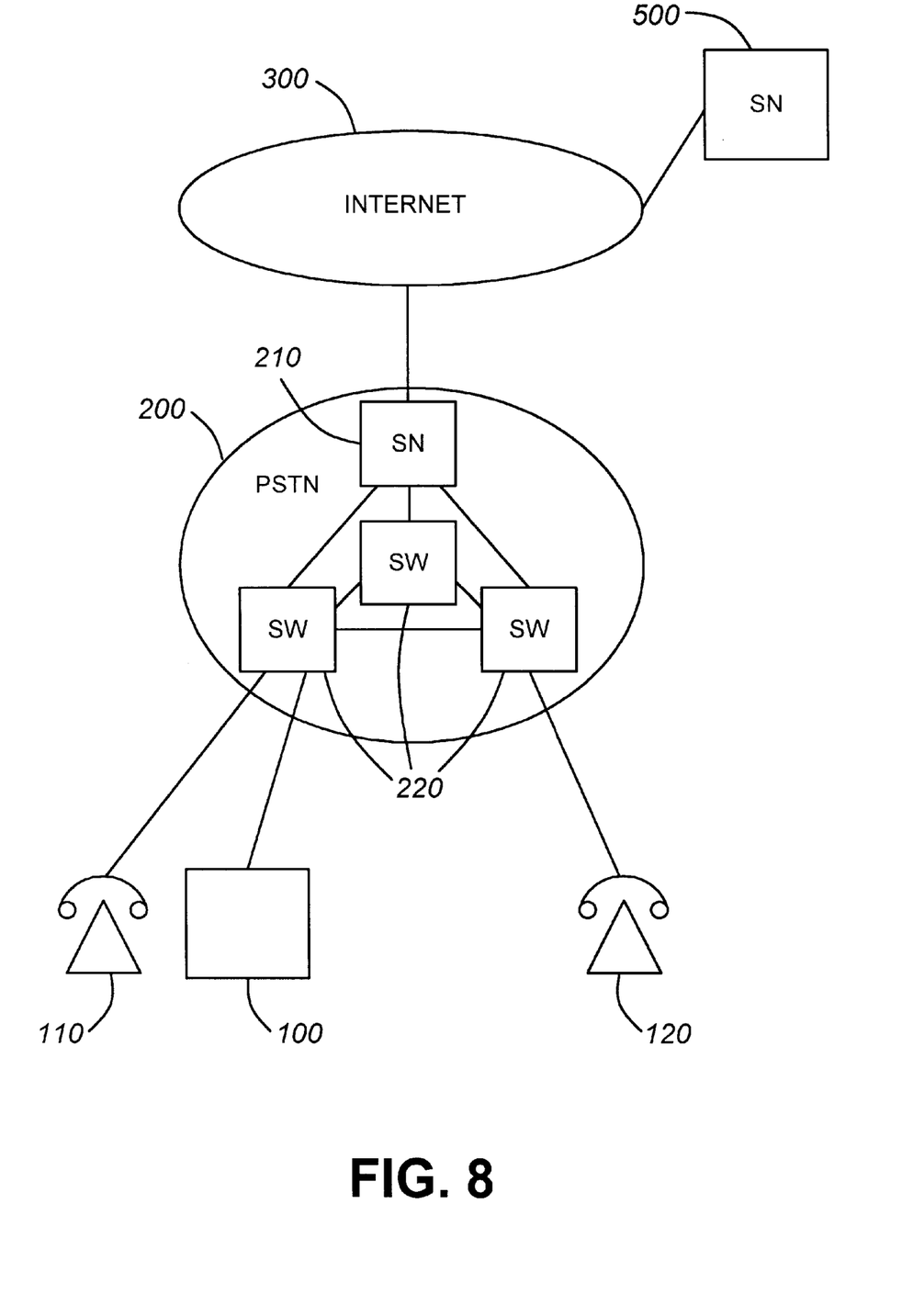
FIG. 8 is a block schematic diagram showing interconnected telecommunications networks incorporating another embodiment of the invention.

Call completion services could also be provided by Inter-Exchange Carriers (IECs) using service node functionality and telecommunications switching functionality present in the PSTN 200. FIG. 8 is a block schematic diagram showing an architecture in which a service node 210 of the PSTN 200 is connected to plural telecommunications switches 220 of the PSTN 200.

In an application of the architecture of FIG. 8, the operator of workstation 100 locates and displays World Wide Web pages provided by the data service node 500. The operator of the workstation 100 executes a voice call request command on the page of displayed information to request a voice connection. The workstation 100 executes HTML instructions corresponding to the voice call command to send the data service node 500 a call request message incorporating the directory number of his telephone 110.

The data service node 500 receives the message and selects a directory number associated with the particular voice call request command executed by the operator of the workstation 100 (unless the voice call request command already includes both directory numbers). The data service node 500 formulates and sends a call origination message containing both directory numbers and a billing code to the PSTN service node 210 via the Internet 300.

The PSTN service node 210 verifies that the billing code is valid and forwards the call origination request to one of the telecommunications switches 220, the switch being selected according to the directory numbers of the telephones 110, 120 using routing tables at the service node 210 The selected telecommunications switch 220 processes the call origination request to originate a voice call from the selected telecommunications switch 220 via the PSTN 200 to the telephone 120. The selected telecommunications switch 220 also originates a voice call from the selected telecommunications switch 220 to the telephone 110. The selected telecommunications switch 220 connects the two calls to connect the telephone 110 to the telephone 120 via the PSTN 200 and the selected switch 220. Once the call is complete, the data service node 210 sends billing information to the data service node 500 so that the cost of the call can be billed back to the calling party.

In the architectures of FIGS. 1, 5 and 6, all calls which are requested of the data service node 500 are routed through a single telecommunications switch 510, 540, 710 which appears at a single location in the PSTN 200. In the architecture of FIG. 8, because the PSTN service node 210 is connected to and can select from among multiple geographically distributed telecommunications switches 220 of the PSTN 200 for call completion, the requested call can generally be routed more efficiently and at lower cost than in the architectures of FIGS. 1, 5 and 6.

Figure 9:
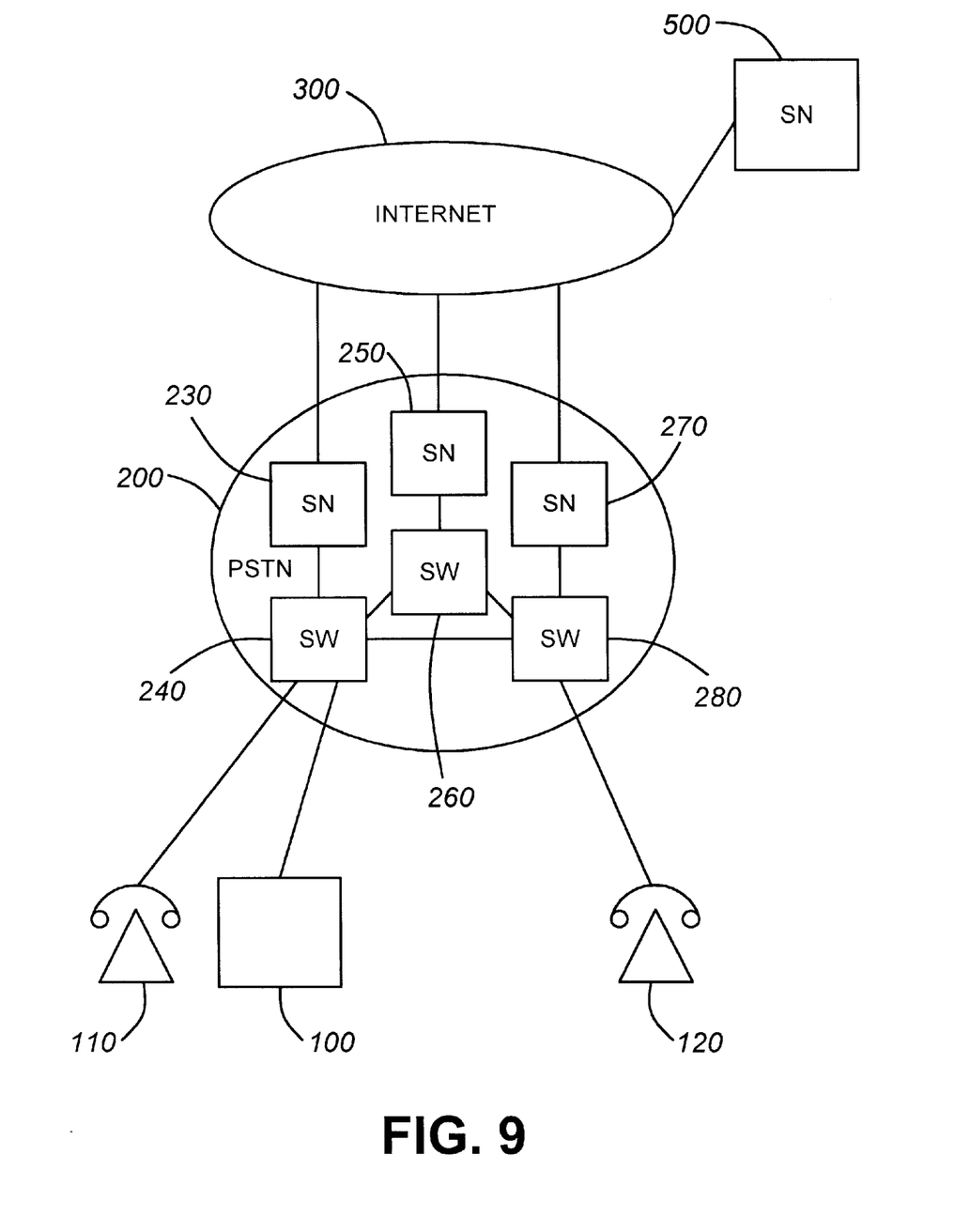
FIG. 9 is a block schematic diagram showing interconnected telecommunications networks incorporating another embodiment of the invention.

The architecture of FIG. 8 can be modified by providing multiple service nodes in the PSTN 200. FIG. 9 illustrates an architecture in which a separate service node 230, 250, 270 is provided for each telecommunications switch 240, 260, 280. Each data service node 500 can be programmed to send call origination requests to a respective one of the service nodes 230, 250, 270 of the PSTN to distribute the processing load across multiple service nodes. Each data service node 500 could be programmed with a prioritized list of service nodes 230, 250, 270 so that it can route call origination traffic to alternative service nodes if its preferred service node is unavailable.

Several alternative embodiments of the invention are described above. These and other variations are within the scope of the invention and are intended to be within the scope of the claims below.

We claim:

1. A method for originating a voice call between a first voice terminal and a second voice terminal, the method comprising:

sending a voice call request from a data terminal to a data service node, the voice call request identifying the first voice terminal;

transmitting a call origination request from the data service node to a telecommunications switch, the call origination request identifying the first and second voice terminals;

in response to the call origination request received from the data service node, originating at the telecommunications switch one call from the telecommunications switch to the second voice terminal and another call from the telecommunications switch to the first voice terminal; and connecting the one call to the other call at the telecommunications switch to connect the first voice terminal to the second voice terminal;

wherein a first data service node forwards the voice call request to a second data service node, the first data service node selects the second data service node based on predetermined criteria, and the second data service node transmits the call origination request to the telecommunications switch.

2. The method as defined in claim 1, wherein said predetermined criteria includes the first voice terminal identifier.

3. The method as defined in claim 1, wherein the predetermined criteria includes time of day.

4. The method as defined in claim 1, wherein the predetermined criteria includes network traffic load.

5. A data service system, comprising:

a plurality of data service nodes for connection to a data network and a plurality of telecommunications switches, each data service node being connected to a respective telecommunications switch, each data service node comprising:

means for receiving voice call requests comprising respective first voice terminal identifiers from data terminals connected to the data network and from other data service nodes connected to the data network, the first voice terminal identifiers identifying respective first voice terminals associated with respective data terminals;

means for forwarding selected voice call requests to selected other data service nodes, said other data service nodes being selected based on predetermined criteria; and means for transmitting to the telecommunications switch call origination requests in response to selected voice call requests including voice call requests forwarded from other data service nodes, each said call origination request comprising the first voice terminal identifier of the selected voice call request and a second voice terminal identifier, the second voice terminal identifier identifying a second voice terminal associated with the data service node; and each telecommunications switch comprising:

means responsive to a call origination request received from a data service node for originating one call from the telecommunications switch to a second voice terminal and another call from the telecommunications switch to the first voice terminal the first and second voice terminals being identified in the call origination request; and means for connecting the one call to the other call to connect the first voice terminal to the second voice terminal.

6. The data service node as claimed in claim 5 where said predetermined criteria includes the first voice terminal identifiers in said voice call requests.

7. The data service node as claimed in claim 5 where said predetermined criteria includes time of day.

8. The data service node as claimed in claim 5 where said predetermined criteria includes network traffic load.

9. A data service node for connection to a data network to provide a data service, the data service node comprising:

means for receiving voice call requests comprising respective first voice terminal identifiers from data terminals connected to the data network and from other data service nodes connected to the data network, the first voice terminal identifiers identifying respective first voice terminals associated with respective data terminals; means for forwarding selected voice call requests to selected other data service nodes, said other data service nodes being selected based on predetermined criteria; and means for transmitting to a telecommunications switch call origination requests in response to selected voice call requests including voice call requests forwarded from other data service nodes, each said call origination request comprising the first voice terminal identifier of the selected voice call request and a second voice terminal identifier identifying a second voice terminal associated with the data service node.

10. The data service node as claimed in claim 9 where said predetermined criteria includes the first voice terminal identifiers in said voice call requests.

11. The data service node as claimed in claim 9 where said predetermined criteria includes time of day.

12. The data service node as claimed in claim 9 where said predetermined criteria includes network traffic load.

* * * * *